US006990615B2

(12) United States Patent  (10) Patent No.: US 6,990,615 B2
Goudie  (45) Date of Patent: Jan. 24, 2006

(54) DATA PROCESSING DEVICE

(75) Inventor: Alistair Goudie, Lincoln (GB)

(73) Assignee: Zarlink Semiconductor Limited, Wiltshire (GB)

( * ) Notice: Subject to any disclaimer, the term of this patent is extended or adjusted under 35 U.S.C. 154(b) by 520 days.

(21) Appl. No.: 10/372,640

(22) Filed: Feb. 21, 2003

(65) Prior Publication Data

US 2003/0200490 A1    Oct. 23, 2003

(30) Foreign Application Priority Data

Feb. 22, 2002  (GB) .................................. 0204209

(51) Int. Cl.
 *H04L 1/20*  (2006.01)

(52) U.S. Cl. ..................................... 714/709; 714/814

(58) Field of Classification Search ................ 714/709, 714/814
See application file for complete search history.

(56) References Cited

U.S. PATENT DOCUMENTS

| | | | |
|---|---|---|---|
| 6,137,844 A | 10/2000 | Maresca | |
| 6,263,035 B1 | 7/2001 | Maresca | |
| 6,272,183 B1 * | 8/2001 | Berens et al. ............... | 714/786 |
| 6,738,364 B1 * | 5/2004 | Saunders ..................... | 370/332 |
| 2003/0061564 A1 * | 3/2003 | Maddux ..................... | 714/709 |

FOREIGN PATENT DOCUMENTS

| | | |
|---|---|---|
| EP | 0 317 159 A2 | 5/1989 |
| EP | 0 551 596 A1 | 7/1993 |
| EP | 0 551 695 A1 | 7/1993 |

OTHER PUBLICATIONS

UK Search Report, GB 0204209.1, Pending.

* cited by examiner

*Primary Examiner*—R. Stephen Dildine
(74) *Attorney, Agent, or Firm*—Dority & Manning, P.A.

(57) ABSTRACT

A data and clock recovery circuit is provided for generating a recovered version of a transmitted data stream. The data and clock recovery circuit comprises three main circuit modules, namely a data recovery circuit, a clock recovery circuit, and a detector circuit. The data recovery circuit is arranged to receive a data stream, and to generate therefrom an estimate of the signal levels for each bit-period of the originally transmitted data stream. The estimates of the signal levels are stored within the data recovery circuit and are sampled by the clock recovery circuit so that the original data stream is recovered. The data recovery circuit is also arranged to generate a so-called "word metric" which is a quality factor representing the accuracy of the estimated signal levels. The clock recovery circuit is arranged to use both the received data stream, and the word metric generated in the data recovery circuit, to determine whether or not the current sampling time is optimal. If not, the current sampling time is adjusted so that it moves towards an "ideal" sampling time. The detector circuit, which may correspond to a correlator in some embodiments, is arranged to determine when the start of a new data stream is received.

20 Claims, 5 Drawing Sheets

DATA PROCESSING DEVICE

CROSS-REFERENCE TO RELATED APPLICATIONS

The present application claims priority to currently pending United Kingdom Patent Application number 0204209.1, filed on Feb. 22, 2002.

STATEMENT REGARDING FEDERALLY SPONSORED RESEARCH OR DEVELOPMENT

N/A

BACKGROUND OF THE INVENTION

This invention relates to a data processing device, and particularly to a data processing device for receiving a degraded data stream and generating therefrom an estimate of the original, non-degraded, data stream.

Digital data that is transmitted over some link, be it physical or wireless, will usually be degraded to some extent. For example, noise or electromagnetic interference can affect the data such that errors will be present in the received data. The degradation may affect the amplitude of the data and/or the timing of the data. In serious cases, degradation of the amplitude of the data may result in a "high" level signal being interpreted as a "low" level signal. Timing errors, such as clock jitter, can cause a loss of synchronization.

Accordingly, digital data receiving devices often use data and timing recovery circuits that attempt to recover the originally transmitted data. Conventional recovery circuits, such as the wireless local area network (LAN) chip WL102, generally use edge detection techniques combined with a state machine for detecting the start of a data packet. State machines have disadvantages since the ability to identify a good data packet relies on the state machine being in a correct initial state.

It is desirable to provide a reliable digital data processing device for recovering good data packets from a received degraded data stream.

SUMMARY OF THE INVENTION

The aspects and advantages of the invention may be realized and attained by means of the instrumentalities and combinations particularly pointed out in the appended claims. Additional aspects and advantages of the invention will be set forth in part in the description that follows, and in part will be obvious from the description, or may be learned by practice of the invention.

According to a first aspect of the invention, there is provided a data processing device that includes a data recovery circuit and a clock recovery circuit. The data recovery circuit has at least one input for receiving a first data stream characterized by a first bit-rate and a plurality of signal levels. The data recovery circuit is configured to generate an estimate of the signal level for each bit-period of the first bit-rate and to generate, using each estimated signal level, a quality factor representative of the accuracy of each estimated signal level. The clock recovery circuit has at least one input for receiving the first data stream and at least one input for receiving the quality factor generated by the data recovery circuit. The clock recovery circuit is configured to determine from the quality factor a first plurality of sampling times at which the first data stream should be sampled and to sample the estimated signal levels in accordance with the determined first plurality of sampling times. The clock recovery circuit is further configured to generate a second data stream representing a recovered version of the received first data stream.

The data processing device is arranged as a combined data and clock recovery circuit. The quality factor is calculated from and used to adjust the sampling times of the estimated signal levels of the first data stream, wherein the first data stream represents a degraded version of an original non-degraded data stream. Thus, reliable recovery of the original data stream (in terms of signal level and timing) can be achieved.

The second data stream as generated by the data processing device should be substantially the same as the original non-degraded data stream intended for a receiving device. In this context, it will be appreciated that any clock and data recovery circuit/method may result in there being differences between the transmitted and recovered data streams, particularly where millions of bits are being transmitted every second. What is important is that the circuit/method is efficient, that is, the differences are minimal. The data processing device achieves clock and data recovery with good efficiency using an integrated architecture.

The data recovery circuit may be arranged to sample the first data stream at a second bit-rate, which is greater than that of the first bit-rate, to add together data samples taken within each bit-period of the first bit-rate, and to quantize the sum that results from the addition such that the sum occupies one of a plurality of threshold levels, the quantized result representing the estimated signal level for each bit-period of the first bit-rate. The second bit-rate is preferably an integer multiple of the first bit-rate. This "oversampling" bit-rate is preferably four or more times the first bit-rate.

The data samples within each bit-period of the first bit-rate may be weighted prior to being added together (i.e., multiplied by predetermined weighting factors), data samples taken substantially towards the center of each bit-period being weighted by a greater amount than data samples taken substantially towards the start and end of each bit-period.

In effect, the data recovery circuit can be arranged as a finite impulse response (FIR) filter.

The quality factor can be determined by means of weighting and adding data samples taken within each bit-period, the weighting being arranged such that data samples taken substantially in the center of each bit-period are weighted by a greater amount than data samples taken substantially towards the start and end of each bit-period.

The data processing device may further comprise a detector circuit for detecting the first data stream. The detector circuit may correspond to a correlator arranged to compare a synchronization data stream with the second data stream to identify when such data streams substantially match one another.

The quality factor may indicate the estimated optimal sampling time for each bit-period, the clock recovery circuit being arranged to compare the estimated optimal sampling time with the current sampling time and to advance or delay the current sampling time so that it moves towards the estimated optimal sampling time estimate.

According to a second aspect of the present invention, there is provided a method for recovering a transmitted data stream, the method including the following steps:

(i) receiving a first data stream at a first bit rate, the first data stream being derived from a second data stream transmitted from a data source at the first bit-rate and having a plurality of signal levels;

(ii) generating, for each bit-period of the first bit-rate, an estimate of the transmitted signal level;

(iii) generating, from each estimate of the transmitted signal level, a quality factor indicating the accuracy of each estimated signal level; and (iv) calculating, from the quality factor, a time at which the first data stream should be sampled, and thereafter sampling the estimated signal levels in accordance with the time so determined to generate a third data stream which is substantially the same as the second data stream.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
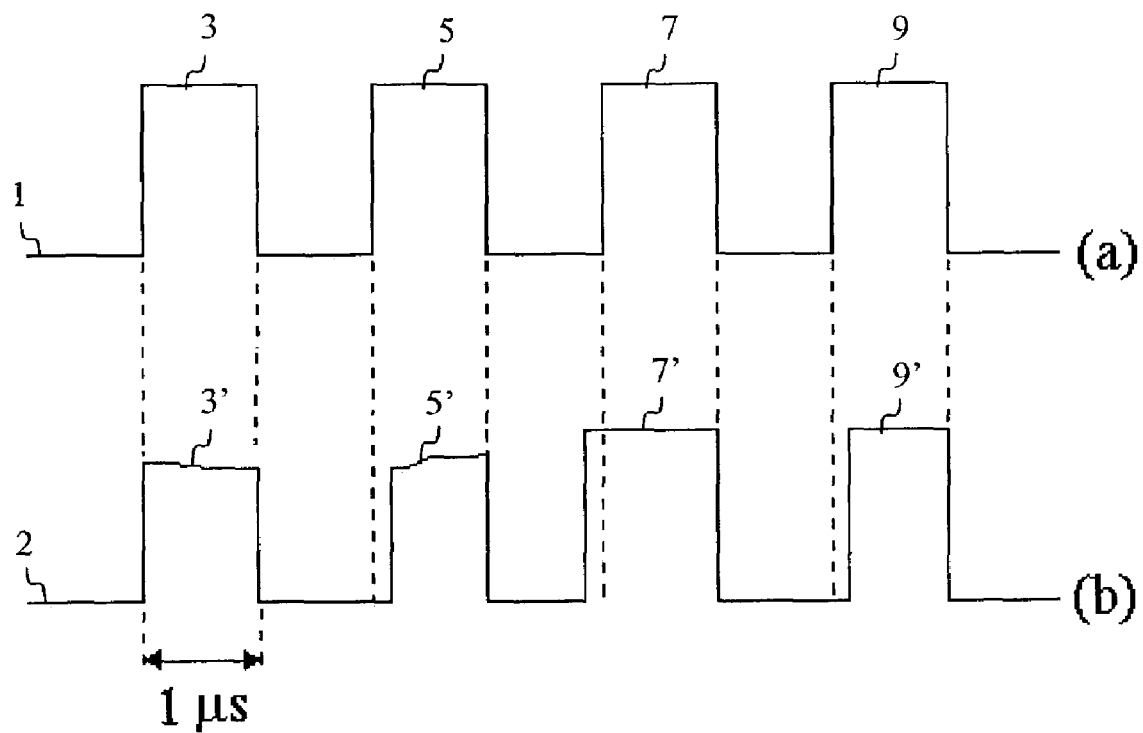
FIG. 1 shows exemplary respective transmitted data stream (a) and received data stream (b)

Referring to FIG. 1, part of a Transmitted data stream 1 is shown at (a), the data stream comprising two alternating signal levels (i.e., the signal level alternates between a "low" level and a "high" level). The transmitted data stream 1 has a bit-rate of one(1) Mbit/sec, and thus each bit has a bit-period of one(1) $\mu$s. If the transmitted data stream 1 is transmitted over some non-perfect data channel, for example a wireless radio channel, the data stream will experience degradation, perhaps due to noise and other atmospheric effects.

Figure 2:
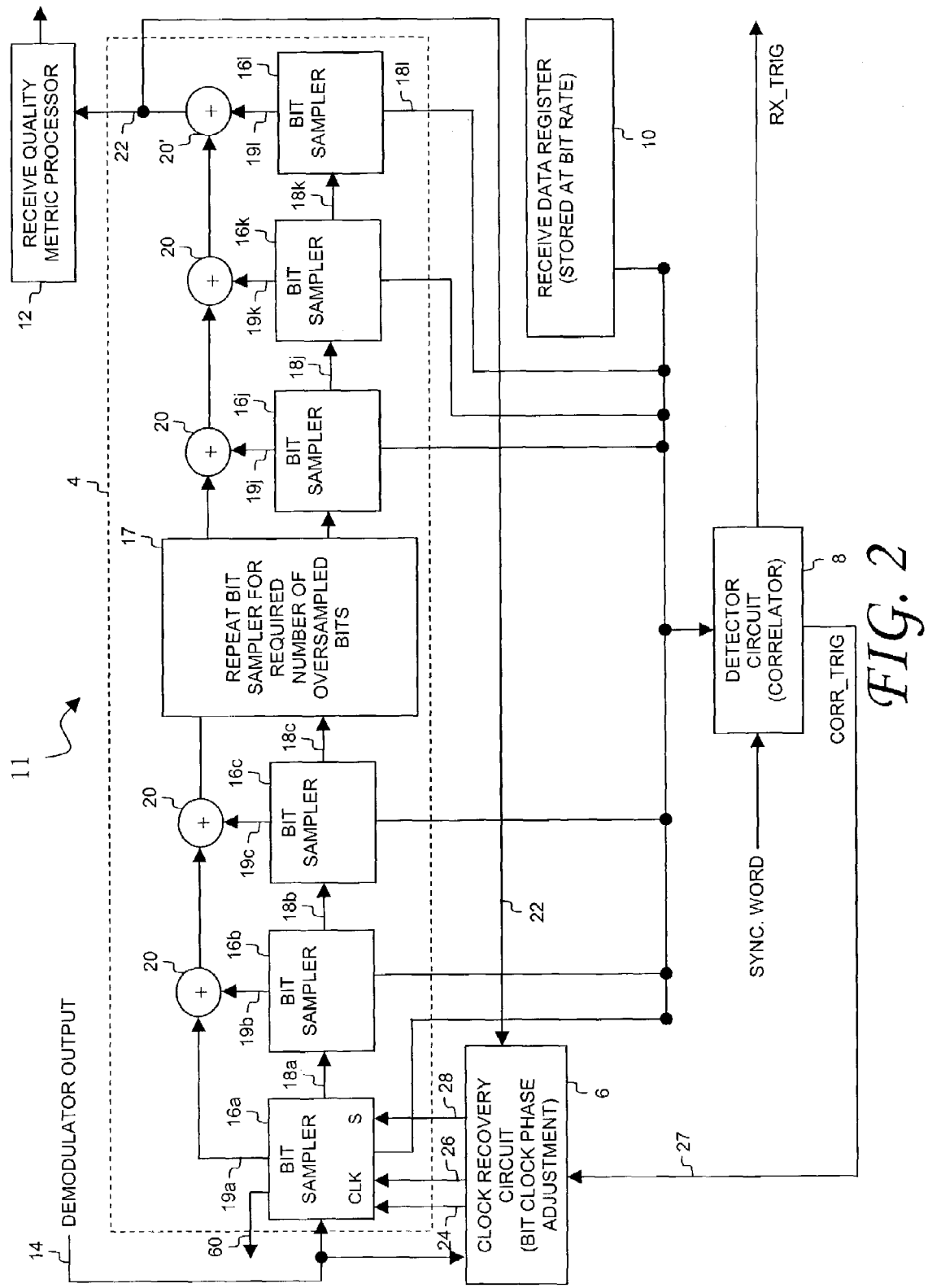
FIG. 2 is a block diagram of an exemplary data and clock recovery circuit according to the invention.

FIG. 1 also shows at (b) a received data stream 2, which is a degraded version of the transmitted data stream 1 shown at (a) in FIG. 1. The received data stream 2 represents the output from a demodulator circuit in a receiver, the demodulator having received the transmitted data stream 1 over some channel. As will be seen, the pulse 3 of FIG. 1 is affected such that the amplitude of the received version 3' is degraded. The pulse 5 is affected such that both the amplitude and timing of the received version 5' is degraded. Pulses 7 and 9 are affected such that only the timing of their respective received versions 7' and 9' is degraded. If such a degraded data stream 2 is passed to a receiving device, e.g., a computer, errors may occur in the data such that the operation of the computer may be hindered. Accordingly, a special data processing device is required after the demodulation state, namely a data and clock recovery circuit. FIG. 2 shows a data and clock recovery circuit 11 which advantageously combines the functions of data and timing recovery in an integrated system.

Referring to FIG. 2, the data and clock recovery circuit 11 comprises three main circuit modules, namely a data recovery circuit 4, a clock recovery circuit 6, and a detector circuit 8. The data recovery circuit 4 is arranged to receive the received data stream 2, and to generate therefrom an estimate of the signal levels for each bit-period of the originally transmitted data stream 1. Thus, since the transmitted data stream 1 was sent at a bit-rate of one(1) Mbit/sec, then a signal level is estimated for every one(1) $\mu$s of the received data stream 2. The estimates of the signal levels are stored within the data recovery circuit 4 and are sampled by the clock recovery circuit 6 so that the original data stream is recovered.

The data recovery circuit 4 is also arranged to generate a so-called "word metric" which is a quality factor representing the accuracy of the estimated signal levels. The clock recovery circuit 6 is arranged to use both the received data stream 2, and the word metric generated in the data recovery circuit 4, to determine whether or not the current sampling time is optimal. If not, the current sampling time is adjusted so that it moves towards an "ideal" sampling time. The correlator 8 is arranged to determine when the start of a new data stream is received.

The data recovery circuit 4, the clock recovery circuit 6, and the detector circuit 8 will now be described in detail.

The data recovery circuit 4 comprises twelve "bit-samplers" 16a–16l, although for the sake of clarity, only six bit-samplers 16a–16c and 16j–16l are shown in FIG. 2. Intermediate bit-samplers 16d–16i are represented by the intermediate bit-sampler circuit 17. The first bit-sampler 16a is connected to a circuit input line 14 which transfers the received data stream 2 from the demodulator (not shown). The bit-samplers 16a–16l are arranged in series such that data is shifted from the output of one bit-sampler to the input of the next bit-sampler, e.g., from the output 18a of the first bit-sampler 16a to the input of the second bit-sampler 16b. The data stored within each of the bit-samplers 16a–16l is inputted to the detector circuit 8, as will be explained in more detail below.

Each bit-sampler 16a–16l is configured to oversample the received data stream 2 at five-times the bit-rate of the transmitted data stream 1. In other words, since the transmitted data stream 2 is sent at a bit-rate of 1 Mbit/sec, five samples are taken every 1 $\mu$s bit-period. In order to do this, the data recovery circuit 4 receives a clock signal which is fives times that of the bit-rate of the transmitted data stream, i.e., 5 Mbit/sec. Each bit-sampler 16a–16l receives the 5 Mbit/sec clock signal on clock line 24. In FIG. 2, only the first bit-sampler 16a is shown connected to the 5 Mbit/sec clock line 24.

The oversampled data stream is processed so that an estimate of the signal level, which will be either a "high" or "low" signal level, is stored every 1 μs bit-period of the received data stream 2, and also so that a quality factor for each 1 μs of the data stream (the so-called "bit metric") is calculated, the bit metric providing an indication of the accuracy of the signal level estimate. Each bit metric is outputted on respective bit metric lines 19a to 19l, each bit metric thereafter being added together by a series of adders 20 to generate the word-metric (mentioned above).

Figure 3:
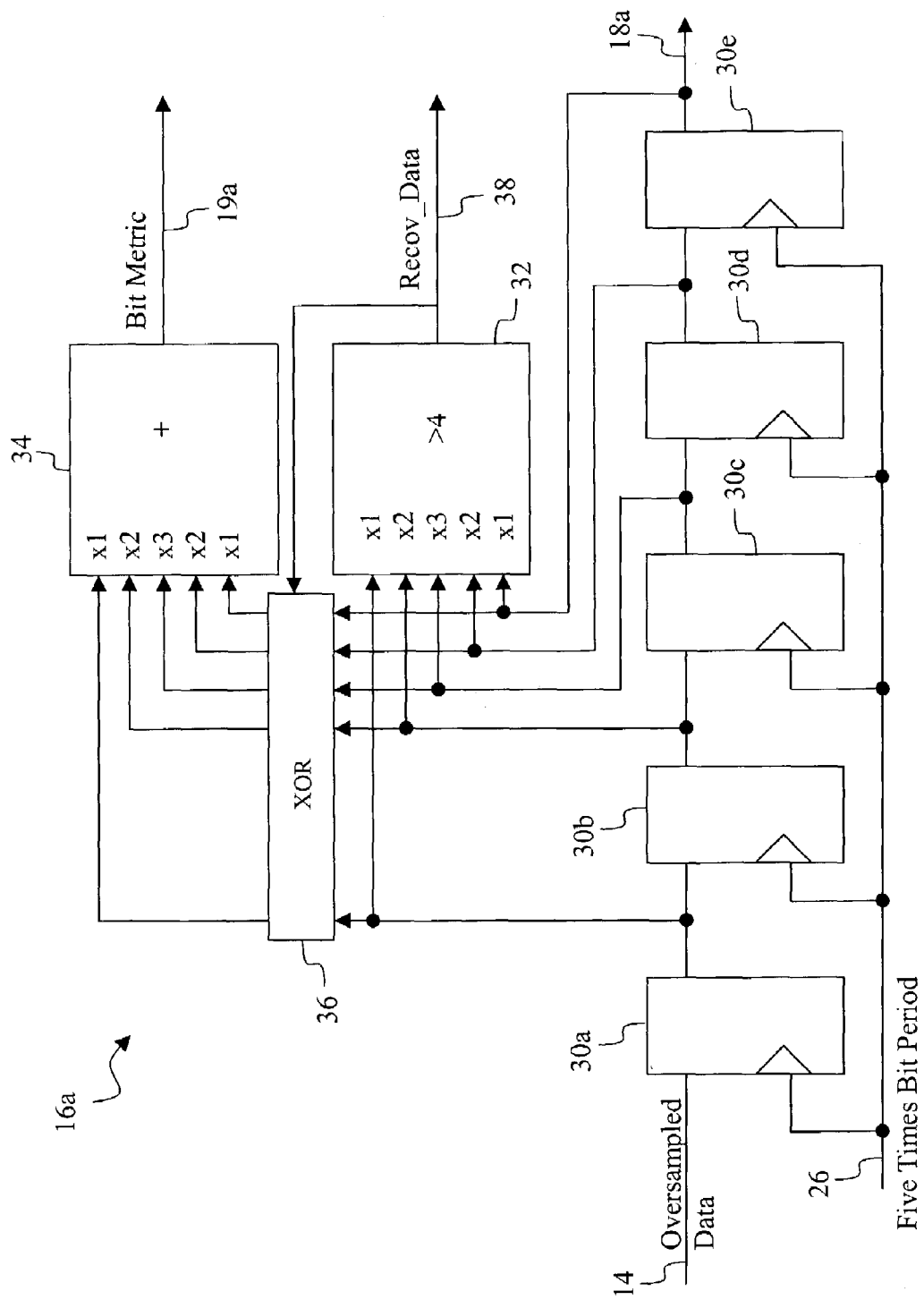
FIG. 3 is a circuit diagram of an exemplary bit-sampler, as shown in FIG. 2.

FIG. 3 is a block diagram of the first bit-sampler 16a. It should be appreciated that the arrangement of each of the second to twelfth bit-samplers 16b–16l is preferably the same as that shown in FIG. 3.

Referring to FIG. 3, the first bit-sampler 16a comprises first to fifth D-type latches or flip-flops 30a–30e, a first calculation circuit 32, a second calculation circuit 34, and an Exclusive-OR (XOR) circuit 36' The first to fifth D-type latches 30a–30e are arranged in series such that the output of the first D-type latch 30a is connected to the input of the second D-type latch 30b, and so on. The circuit input line 14 is connected to the input of the first D-type latch 30a, and the output line 18a of the fifth D-type latch 30e is connected to the input line of the second bit sampler 16b, as is shown in FIG. 2. The first to fifth D-type latches 30a–30e are each clocked by the 5 Mbit/sec clock signal 26 so that, for each 1 μs bit-period of the 1 Mbit/sec data stream, five samples are taken of the input signal level, the samples being stored and shifted along the D-type latches for each cycle of the 5 Mbit/sec clock.

The first bit-sampler 16a generates an estimate of the transmitted signal level by means of performing a "majority voting" operation on the oversampled data. This operation is performed by the first calculation circuit 32. The first calculation circuit 32 receives the five data samples stored in the first to fifth D-type latches 30a–30e. Inputs to the first calculation circuit are weighted such that the data samples from the first and fifth D-type latches 30a and 30e are multiplied by one, the data samples from the second and fourth D-type latches 30b and 30d are multiplied by two, and the data from the third D-type latch 30c is multiplied by three. This arrangement of weightings makes use of the fact that data samples taken towards the middle of a bit-period are more likely to be correct than those at the start and end of the bi-period (which are more likely to be affected by glitches or clock jitter). Accordingly, rather than performing a simple averaging operation, greater significance is given to the central data samples in deciding whether the correct signal level for a particular bit-period is a "high" or a "low" level. The weighted results are added together in the first calculation circuit 32, which outputs a "high" level signal at the "Recov_data" output line 38 if the sum is greater than four. Four is chosen as a suitable threshold for deciding whether the sum of the weighted data samples indicate a "high" or "low" level signal. It should be appreciated that in other circumstances, a different threshold might be chosen. This "thresholding" results in quantization of the data.

The first bit-sampler 16a calculates the bit metric by means of a similar weighting and adding operation, this being performed by the second calculation circuit 34. As with the first calculation circuit 32, the second calculation circuit receives the five data samples stored in the first to fifth D-type latches 30a–30e. However, in this case, the data samples are received via the XOR circuit 36 which is enabled only if the output from the first calculation circuit 32 is "high." The XOR circuit 36 modifies the signals from the D-type latches 30a–30e so that the signal into the second calculation circuit 34 will be "higher" if it is not the same as "Recov_data" 38 or "low" if it is the same as "Recov_data" 38. Again, the inputs to the second calculation circuit 34 are weighted such that data samples from the first and fifth D-type latches 30a and 30e are multiplied by one, the data samples from the second and fourth D-type latches 30b and 30d are multiplied by two, and the data from the third D-type latch 30c is multiplied by three. The output from the second calculation circuit 34 represents the sum of those bits which disagree with "Recov_data" 38 and will be in the range 0 (if no bits disagree) to 4. Any combination of inputs that produce a sum in the range 5 to 9 will result in "Recov_data" 38 changing polarity and the resulting sum being in the range 4 to 0.

To illustrate the operation of the first and second calculation circuits, consider the case where a non-degraded pulse having a bit-period of one (1) μs and "high" level signal level is inputted to the first bit-sampler 16a. Initially, at a time, t1 only the first D-type latch 30a will hold a "high" level signal. Accordingly, the weighted sum will be one, and so a "low" level signal is output since this is not grater than four. The output from the second calculation circuit 34 will be one since "Recov_data" 38 only disagrees with D-type latch 38a. At a time t2, the first and second D-type latches 30a–30b will hold a "high" level signal, and so the output from the first calculation circuit 32 will again be "low" and the output from the second calculation circuit 34 will increase to three. At a time t3, the first, second and third D-type latches 30a–30c will hold a "high" level signal, and so now the output from the first calculation circuit 32 will be "high" since the weighted addition of six is greater than four. Accordingly, the XOR circuit 36 is enabled and so the second calculation circuit 34 will output a three (nine minus six).

At the time when all of the D-type latches 30a–30e hold a "high" level signal, the output from the first calculation circuit 32 will again result in a "high" level signal and the output from the second calculation circuit 34 will be zero since none of the data samples disagree. Thus, it follows that the bit metric, output on bit metric line 19a from the second calculation circuit 34, will be at its minimum at the best, or optimum, sampling time (all of the stored data samples tending towards agreement at this time). When the bit metric is at its maximum, this will be the worst sampling time, since the data samples tend towards disagreement at this time. As the data samples are shifted out of the D-type latches 30a–30e, and into D-type latches of the following, second bit-sampler 16b, the "low" level signal following the "high" pulse is shifted into the D-type latches. Accordingly, the output from the first calculation circuit 32 will return "low" when the weighted sum is four or less, and the output from the second calculation circuit 34 will begin to increase again as the data samples tend to disagree.

Figure 4A:
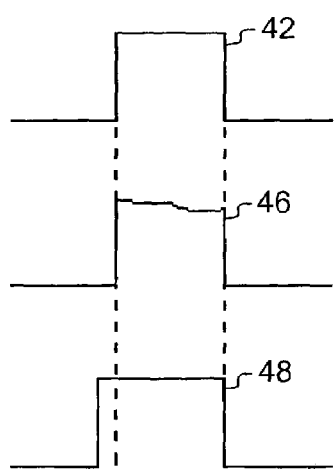
FIGS. 4A and 4B respectively show three graphical representations of word-metric data outputted from the data and clock recovery circuit shown in FIG. 2.
Figure 4B:
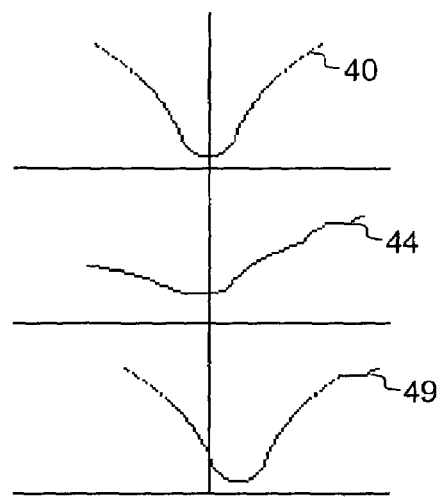

FIG. 4B shows a graphical representation 40 of a bit metric for the above-described ideal case of a non-degraded pulse 42 (non-degraded in terms of its period and amplitude) as illustrated in FIG. 4A. FIG. 4B shows a similar graphical representation 44 for a pulse 46 (from FIG. 4A) having degraded amplitude. Note how the minimum and maximum points of the bit metric representation 44 are closer together. Indeed, these points will tend to converge as the amplitude degradation increases. If a pulse is subject to clock degradation such as in pulse 48 of FIG. 4A, this will result in the graphical representation 49 of the bit metric being shifted, as shown in FIG. 4B.

Referring back to FIG. 2, the above-described operation of the first bit-sampler 16a is repeated by the second to eleventh bit-samplers 16b to 16l as the received data stream 2 is clocked through. Thus, the oversampled data stream is retained for twelve bit-periods, or twelve (12) µs. As mentioned previously, each bit metric outputted from the second calculation circuit 34 is summed together by the adders 20. The last adder 20 outputs the word metric on the word metric line 22. As mentioned previously, the word metric is a quality factor which represents the accuracy of the overall signal levels stored in the bit-samplers 16a–16l. In graphical representation, the word metric is an exaggerated version of the bit metric. Thus, degradation of the received data stream 2 will affect the appearance of the word metric in the same way as for the individual bit metrics mentioned above. The word metric is output to a receive quality metric processor 12 which outputs a numerical indication of the accuracy of the data and clock recovery circuit 11. This numerical indication is called the "receive quality metric." Specifically, when the clock recovery circuit 6 sets a "lock" flag (described later) the current word metric is multiplied by thirty two and loaded in the receive quality metric processor 12. Then, for every bit-period, the following algorithm is followed:

If (('word metric'×32)>'receive quality metric')
Then 'receive quality metric'='receive quality metric'+32
Else if 'receive quality metric'>0
Then 'receive quality metric'='receive quality metric'−1.

The receive quality metric processor 12 needs to be able to hold 13×4×32=1664 different values, and so should be at least 11-bits long. The outputted received quality metric will be the eight most significant bits of data stored in the receive quality metric processor 12. By the end of a data stream, the receive quality metric processor 12 should hold a measure of the "average" variation from ideal data.

The construction of the overall data recovery circuit 4 is comparable to that of a finite impulse response (FIR) filter.

The operation of the detector circuit 8 will now be described. As mentioned above, the detector circuit 8 is configured to detect the start of a new data stream. To do this, the detector circuit 8 receives a "Sync.Word" data stream which corresponds to a synchronization stream contained in the beginning of the received data stream 2. This detector circuit 8 performs a correlation operation on the signal level estimates stored in the data recovery circuit 4 and the "Sync.Word" input, and thereafter determines the start of the received data stream in accordance with the best match between the two.

For the particular case where the data and recovery circuit is to be used with a Bluetooth receiver, it will be understood that the detector circuit 8 will need to capture 64-bits of data, this being the length of a Bluetooth packet. If only one sample per bit is taken from each of the D-type latches 16a–16l, there may be problems with slip due to the clock recovery circuit 6. If five samples per bit-period were to be used over the entire 64 bit packet (which would give the best performance), there would be significant problems with power consumption and device size requirements. Accordingly, a compromise solution is chosen whereby the oldest recovered data bits (stored in the twelfth bit-sampler 16l) are loaded into a "receive data register" 10. The receive data register 10 outputs the oldest 52-bits, stored therein, to the detector circuit 8. The detector circuit 8 also receives the twelve most recent recovered data bits (stored in the first to twelfth bit-samplers 16a–16l), thereby to construct a 64-bit word which is correlated with Sync.Word. If the correlation result exceeds a predetermined threshold, a correlator trigger signal "Corr_Trig" is generated on Corr_Trig line 27 and the correlator result recorded. A counter (not shown) within the detector circuit 8 counts the number of bit-periods occurring after Corr_Trig is set. If a later correlation result yields a better result before the counter reaches a set number, the new correlation result is recorded, Corr_Trig is again set, and the counter is reset. The process repeats until the counter reaches its set number, at which point the correlator is disabled. The Corr_Trig signal is sent to the clock recovery circuit 6.

The clock recovery circuit 6 will now be described in detail with reference to FIG. 5. The clock recovery circuit 6 generates the 5 Mbit/sec clock signal to the data recovery circuit 4 to oversample the received data stream 2. The frequency of the 5 Mbit/sec is not modified by the clock recovery operation. The clock recovery circuit 6 also generates a data sample signal which pulses "high" to indicate the current estimate of the "ideal" sample time. The data sample signal line 28 is used in the clock recovery circuit 6, is passed to the detector circuit 8, and is used to generate data output on line 60 (See FIG. 2). The clock recovery circuit 6 is also arranged to analyze the received data stream 2, and the word metric generated in the data recovery circuit 4, to determine whether or not the current sampling time is correct. If not, the current sampling time is adjusted so that it moves towards an "ideal" sampling time.

Figure 5:
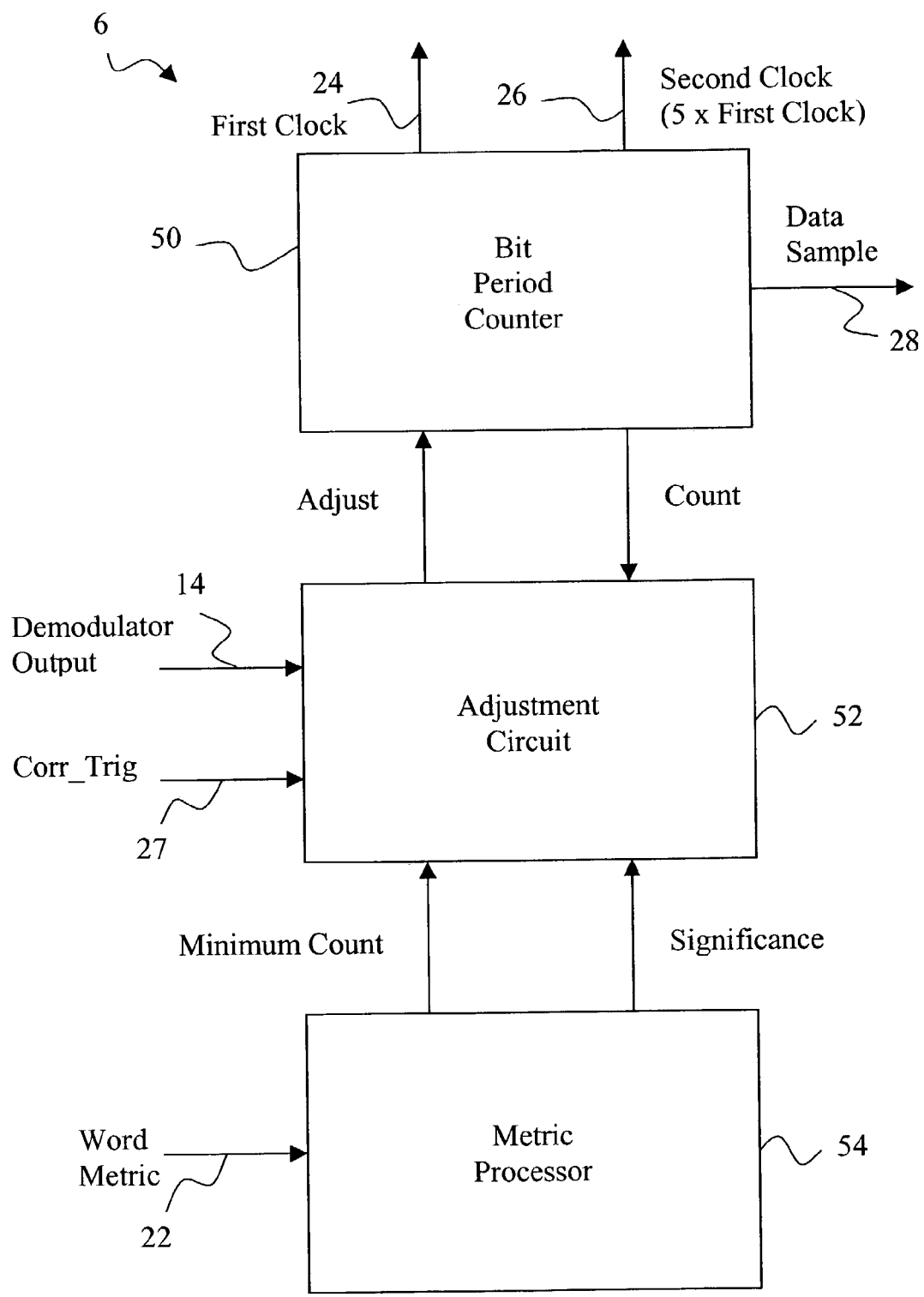
FIG. 5 is a block diagram of an exemplary timing recovery circuit, as shown in part in FIG. 2.

Referring still to FIG. 5, the clock recovery circuit 6 comprises a bit-period counter 50, an adjustment circuit 52, and a metric processor 54. The bit-period counter 50 not only generates the 5 Mbit/sec clock signal on clock line 24 and the data sample signal on line 28, but also includes a counter register which increments in a repeating pattern from −2 to +2 (in binary digits). This repeating pattern is output as a "count" signal to the adjustment circuit 52. The bit-period counter 50 is responsible for sampling the data currently stored in the data recovery circuit 4, this occurring when the count signal is zero. This sampling is performed by outputting a "high" data sample signal on data sample line 28 which is connected to the first bit-sampler 16a. The estimated signal level stored in the first bit-sampler 16a is output on data output line 60 at this time, this signal level representing the first "recovered" data bit of that particular one (1) µs bit-period. The timing of the data sample signal is adjusted by means of advancing or delaying the repeating pattern in the counter register of the bit-period counter 50, this being controlled by an "adjust" signal from the adjustment circuit 52, as will be explained below.

The metric processor 54 is configured to receive the word metric on word metric line 22. As mentioned previously, the word metric (which represents a summed version of the individual bit metrics) indicates the accuracy of the signal levels stored in the bit-samplers 16a–16l. If most data samples agree, then the word metric will be a minimum. At the point where most data samples disagree, the word metric will be a maximum. Ideally, where all the data samples agree and there are a lot of edge transitions in the received data stream 2, the word metric will be very low at the "ideal" sampling time, with the word metric being very large half a bit-period later. Where there are fewer edge transitions, the peak of the word metric will be lower, but the minimum value will also be lower. For more noisy data (i.e., where adjacent data samples are a mix of "high" and "low" level signals), the minimum value will be higher and the peak value will be lower. In other words, the maximum and minimum points will tend to converge.

Within each bit-period, the metric processor 54 captures both the maximum and minimum values of the word metric, and the relative time difference between the minimum point and the current sampling time. The metric processor 54 outputs "significance" data which ranges from two (if the difference between the maximum and minimum points of the word metric is relatively large) to zero (if the difference is relatively small). The relative time difference is outputted as a "minimum count" signal to the adjustment circuit 52.

The adjustment circuit 52 receives (i) the received data stream 2 (or demodulator output) on data input line 14, (ii) the Corr_Trig signal on line 27 from the detector circuit 8, (iii) the "Count" data from the bit-period counter 50, (iv) the "significant" data from the metric processor 54, and (v) the "minimum count" data from the metric processor. The adjustment circuit 52 outputs the "adjust" signal to the bit-period counter 50, as mentioned above.

The adjustment circuit 52 is configured to determine whether or not the current sample time (the time at which the data sample goes "high" on line 28) should be altered, and if so, whether it should be advanced or delayed. At the start of a new data stream, the sample time should synchronize to the data stream as quickly as possible, and so any required adjustment should be made as quickly as possible. Once the sample time is synchronized with the data stream, it should not be necessary for the sample time to be adjusted frequently, and so the rate of adjustment can be reduced.

The adjustment circuit 52 includes a "lock" flag which is reset "low" at the start of a new data stream. The lock flag goes "high" when the adjustment circuit determines that synchronization has taken place. This is achieved by using a three-bit lock counter which is initialized to seven at the start of a new data stream. Each time the metric processor 54 indicates a "significance" signal of two (indicating a large difference between the maximum and minimum points of the word metric) the lock counter is decremented. When the lock counter reaches zero, the lock flag is set. The lock counter is also set if the Corr_Trig signal is high, this indicating that the correlator 8 has detected the start of a new data stream.

The adjustment circuit 52 also includes a nine-bit adjustment counter, which is able to represent values of between −256 and 255. For every bit-period, if the metric processor 54 indicates that the minimum point of the word metric occurs before the current sampling time, the significance value is multiplied by four and the result subtracted from the adjustment counter. If the metric processor 54 indicates that the minimum point occurred after the current sampling time, the significance value is multiplied by four and the result is added to the adjustment counter.

In addition to the above, the received data stream 2 (received on input line 14) is input to an edge detecting circuit. The edge detecting circuit (not shown) consists of a D-type latch clocked by the fastest clock signal available to the circuit. If the input to the D-type latch is different from the output of the D-type latch, an edge has been detected. If the "count" signal from the bit-period counter 50 is negative when the edge is detected, the edge is considered early. If the "count" signal from the bit-period counter 50 is positive when the edge is detected, the edge is considered late. If the "count" signal from the bit-period counter 50 is zero, the edge occurred at the expected time. If an edge is detected at an earlier time than is expected then the adjustment counter is decremented. If an edge is detected later than expected, the adjustment counter is incremented. The edge detecting circuit can provide a finer resolution of adjustment, particularly, if the edge detection circuit is running faster than the 5 Mbit/sec clock signal.

If the lock flag is low, an adjustment will be triggered when the adjustment counter reaches or exceeds +/−8. If the lock flag is set high, an adjustment will be triggered when the adjustment counter reaches or exceeds +/−128. As will be mentioned below, if the adjustment counter is negative, the bit-period counter 50 is advanced, and if the adjustment counter is positive, the bit-period counter is delayed. At the same time, the adjustment counter thresholds (i.e., +/−8 and +/−128) are added or subtracted to the adjustment counter. It should be appreciated that different adjustment counter thresholds may be utilized. The initial value in the adjustment counter, and the thresholds for adjustment are implementation dependent, and can be related to how variable or stable the bit-period is.

As mentioned above, the "adjust" signal from the adjustment circuit 52 indicates whether the current sample time should be advanced or delayed. If the "adjust" signal indicates that the ideal sampling time is earlier than the current sampling time, the bit-period counter 50 is incremented by two (instead of the usual single increment) for a single clock cycle. This means that the bit-period counter 50 will reach zero one clock cycle earlier and so the data sampled one clock cycle earlier. If the "adjust" signal indicates that the ideal sample time is later than the current sample time, the bit-period counter 50 holds the count for one clock cycle so that zero is reached one clock cycle later. Thus, the data is sampled one clock cycle later.

Thus, a feedback loop, or tracking loop, is set up whereby a measure of the accuracy of the data stored in the data recovery circuit 4 is used to determine whether or not the current sampling time is correct, and if not, how the sampling time should be adjusted.

The clock or timing recovery is performed in the clock recovery circuit 6, which takes inputs from both the data recovery circuit 4 and from the detector circuit 8, the detector circuit determining the start of a new data stream. To do this, the detector circuit 8 uses the (already) oversampled data in the data recovery circuit 4, which gives improved correlation results over using only one sample per bit-period. Thus, the overall data and clock recovery circuit is integrated in its operation, and is able to generate an accurate representation of the transmitted data stream 1 from a received and degraded data stream 2. The integration of the individual functional circuit modules (the data recovery circuit 4, the clock recovery circuit 6, and the detector circuit 8) into a single larger functional circuit enhances the performance of each of the circuit modules.

The data and recovery circuit 11 shown in FIG. 2 is designed to meet the particular requirement of the MT1020 Bluetooth baseband chip. A number of the parameters can be modified to suit different applications. For example, in the above circuit, the transmitted data is a two-level signal, i.e., it is either "high" or "low." Accordingly, the data and recovery circuit 11 is designed to recover such two-level signals. For a multi-level signal (i.e., having greater than two signal levels), the offset from mid-rail would be multiplied by the weightings at the second calculation circuit 34 to produce each bit-period metric. For each bit-period, five samples are taken. This could be increased thereby to improve the data recovery, but will also result in an increased device area requirement and a faster second clock signal (both of which will result in higher power consumption).

The data and recovery circuit 11 uses twelve bit-sampler blocks 16a–16l. Increasing the number of blocks will improve resolution and reliability of the data recovered (and the accuracy of the word metric). It will also increase the time available for adjusting the clock in the clock recovery circuit 6 without affecting the detector circuit 8. When the output of bi-samplers are stored as one sample per bit-period, adjusting the clock signal by more than have a bit-period introduces potential bit-slip in the detector circuit 8, resulting in failure to detect a good match.

As already mentioned, the correlator of detector circuit 8 may be 64-bits long since this is the requirement for detecting Bluetooth packets. Other protocols may require a smaller correlator. The above implementation is directed at recovering received data in a Bluetooth system. It is also suitable for other wireless LAN protocols such as IEEE802.11 and HomeRF. The implementation is most suitable for recovering demodulated data packets with data rates of between 20 kHz and 100 MHz. In principal, the circuit can be used to recover data from any type of serial data stream. The described implementation is optimized for extracting packets of data starting with a known field. The complexity is also intended to improve data recovery where noise and/or jitter are present.

While at least one presently preferred embodiment of the invention has been described using specific terms, such description is for illustrative purposes only, and it is to be understood that changes and variations may be made without departing from the spirit or scope of the following claims.

What is claimed is:

1. A data processing device for receiving a degraded data stream and generating therefrom an estimate of the original non-degraded data stream, said data processing device comprising:
    a data recovery circuit with at least one input for receiving a first data stream, said first data stream characterized by a first bit-rate and a plurality of signal levels, wherein said data recovery circuit is configured to generate an estimate of the signal level for each bit period of the first bit-rate and to generate, using each said estimated signal level, a quality factor representative of the accuracy of each estimated signal level; and
    a clock recovery circuit with at least one input for receiving said first data stream and at least one input for receiving said quality factor generated by said data recovery circuit, said clock recovery circuit configured to determine from said quality factor a first plurality of sampling times at which said first data stream should be sampled and to sample the estimated signal levels in accordance with such determined first plurality of sampling times, said clock recovery circuit further configured to generate a second data stream representing a recovered version of said received first data stream.

2. A data processing device as in claim 1, wherein said data recovery circuit comprises a plurality of bit samplers, each bit sampler being configured to respectively generate an estimate of the signal level for at least one selected bit period of the first bit-rate of said first data stream.

3. A data processing device as in claim 2, wherein said data recovery circuit further comprises a plurality of adders configured to receive a bit metric output from at least two of said bit samplers and to combine such bit metric outputs together in a predetermined fashion to generate said quality factor representative of the accuracy of each estimated signal level.

4. A data processing device as in claim 2, wherein each said bit sampler in said data recovery circuit is configured to sample said first data stream at a second bit-rate, the second bit-rate being greater than the first bit-rate, and includes a calculation circuit that adds together data samples taken within each bit-period of the first bit-rate, each bit sampler being further configured to quantize the sum that results from the addition such that the sum occupies one of a plurality of threshold levels, the quantized result representing the estimated signal level for each bit-period of the first bit-rate.

5. A data processing device as in claim 4, wherein said second bit-rate is an integer multiple of said first bit-rate.

6. A data processing device as in claim 4, wherein said clock recovery circuit comprises:
    a processor configured to receive said quality factor from said data recovery circuit;
    an adjustment circuit configured to receive said first data stream; and
    a bit counter for generating at least two outputs for providing to said data recovery circuit, one of said bit counter outputs representative of said first plurality of sampling times and another of said bit counter outputs representative of said second bit-rate.

7. A data processing device as in claim 4, wherein said calculation circuit is further configured to multiply the data samples within each bit-period of the first bit-rate by respective weighting factors prior to adding such data samples together, wherein said weighting factors are defined such that the weighting factors corresponding to data samples taken substantially towards the center of each bit-period are greater than the weighting factors for data samples taken substantially towards the start and end of each bit-period.

8. A data processing device as in claim 1, further comprising a detector circuit configured to detect the start of said first data stream.

9. A data processing device as in claim 8, wherein said detector circuit comprises a correlator with at least two inputs, said at least two correlator inputs comprising a synchronization data stream and said second data stream, said correlator configured to identify when the second data stream and the synchronization data stream substantially match one another.

10. A data processing device as in claim 1, wherein said quality factor indicates the estimated optimal sampling time for each bit-period of said first data stream and wherein said clock recovery circuit comprises a processor and an adjustment circuit configured to compare the estimate of the optimal sampling time with the current sampling time and to advance or delay the current sampling time so that it moves towards the estimated optimal sampling time.

11. A method for recovering a transmitted data stream, the method comprising:
    receiving, at a first bit-rate, a first data stream which is derived from a second data stream transmitted from a data source at the first bit-rate and having a plurality of signal levels;
    generating for each bit-period of the first bit-rate, an estimate of the transmitted signal level;
    generating from each estimate of the transmitted signal level, a quality factor indicating the accuracy of each estimated signal level; and
    calculating, from the quality factor, a time at which the first data stream should be sampled, and thereafter sampling the estimated signal levels in accordance with the time so determined to generate a third data stream which is substantially the same as the second data stream.

12. A method according to claim 11, wherein the step of generating an estimate of the transmitted signal level comprises:

sampling the first data stream at a second bit-rate which is greater than that of the first bit-rate;

adding the data samples within each bit-period of the first bit-rate together; and quantizing the result of the addition such that it occupies one of a plurality of threshold levels, the quantized result representing the estimated signal level for each bit-period of the first bit-rate.

13. A method according to claim 12, wherein the second bit-rate is an integer multiple of the first bit-rate.

14. A method according to claim 12, wherein the data samples within each bit-period of the first bit-rate are weighted prior to being added together, data samples taken substantially towards the center of each period being weighted by a greater amount than data samples taken substantially towards the start and end of each bit-period.

15. A method according to claim 12, further comprising the step of detecting the start of a degraded data stream.

16. A method according to claim 12, wherein the quality factor indicates an estimate of the optimal sampling time for each period of the first bit-rate, and wherein said step of calculating the time at which the first data stream should be sampled comprises comparing the optimal sampling time estimate with the current sampling time and to advance or delay the current sampling time so that it moves towards the optimal sampling time estimate.

17. A method according to claim 11, wherein the quality factor is determined by means of weighting and adding data samples taken within each bit-period of the first bit-rate, the weighting being arranged such that data samples taken substantially in the center of each bit-period are weighted by a greater amount than data samples taken substantially towards the start and end of each bit-period.

18. A method according to claim 11, further comprising the step of detecting the start of a degraded data stream.

19. A method according to claim 18, wherein said step of detecting the start of a degraded data stream comprises comparing a synchronization data stream, representing at least the start of the non-degraded data stream, with the estimate of the non-degraded data stream, thereby to identify when the non-degraded data stream substantially matches the synchronization data stream.

20. A method according to claim 11, wherein the quality factor indicates an estimate of the optimal sampling time for each period of the first bit-rate, and wherein said step of calculating the time at which the first data stream should be sampled comprises comparing the optimal sampling time estimate with the current sampling time and to advance or delay the current sampling time so that it moves towards the optimal sampling time estimate.

* * * * *